H. H. Evarts,
Making Stares.
No. 268.
A. I. Patented Mar. 6, 1860.
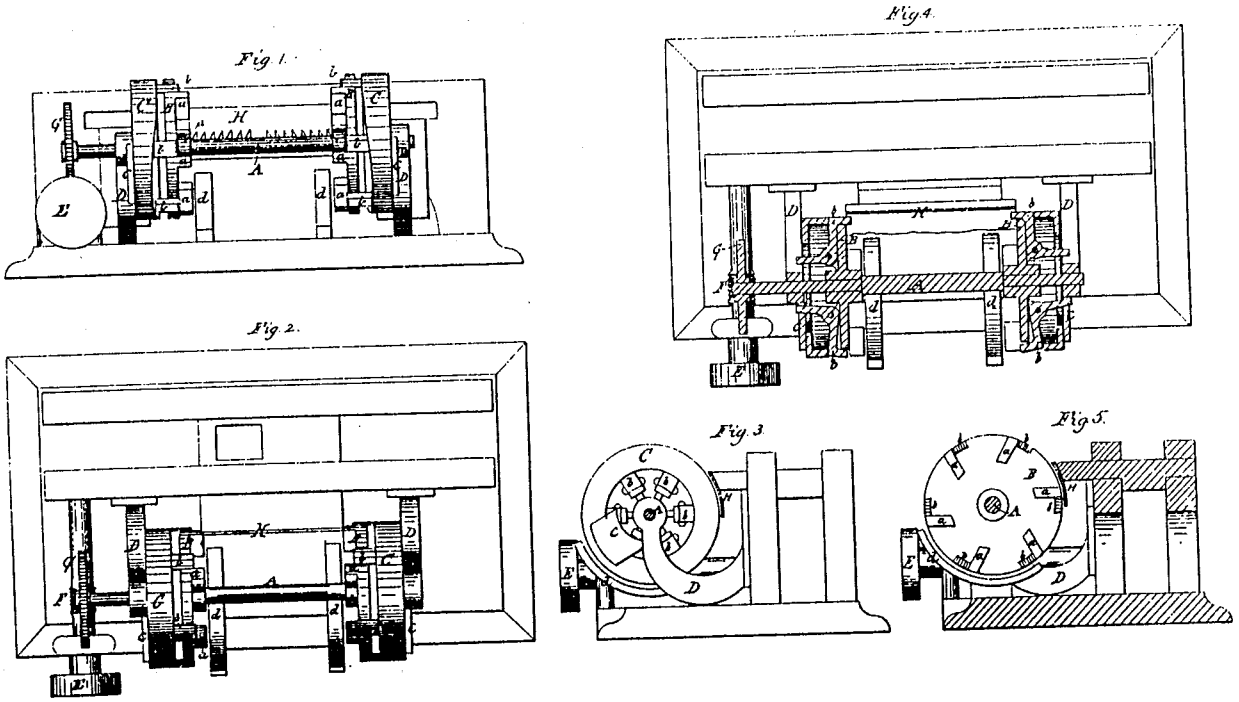
Witnesses.
James Rogers
E. M. Willcox
Inventor.
H. H. Evarts
AM. PHOTO-LITHO. CO. N.Y. (OSBORNE'S PROCESS)